July 22, 1952  A. G. ROSE ET AL  2,604,351
APPARATUS FOR MANIPULATING ARTICLES OF PLASTIC MATERIAL
Filed Nov. 16, 1949

Inventors
Alfred German Rose
and Joseph Arthur Gilbert
By
Munn, Liddy & Glaccum
Attorneys Patented July 22, 1952

2,604,351

UNITED STATES PATENT OFFICE 2,604,351

APPARATUS FOR MANIPULATING ARTICLES OF PLASTIC MATERIAL

Alfred German Rose and Joseph Arthur Gilbert, Gainsborough, England, assignors to Rose Brothers (Gainsborough) Limited, Gainsborough, England, a British company Application November 16, 1949, Serial No. 127,716
In Great Britain November 25, 1948

6 Claims. (Cl. 294—61)

This invention relates to apparatus for manipulating articles of plastic material, e. g., blocks of frozen ice-cream, and more particularly with apparatus for passing such articles through a bath of coating liquid, e. g., chocolate.

According to the invention, there is provided an apparatus for manipulating articles of plastic material comprising a pair of spiked members slidably mounted on a pair of supports for movement in axial directions in such a manner as to penetrate one side of the article so as to seize the articles and support it during subsequent manipulation, the axes of said supports being inclined to each other and to said side of the article.

When dealing with articles such as blocks of frozen ice-cream, each spike member may have only a single tine, but two or more tines may be provided on each spike member if desired. Conveniently, the supports are in the form of rods and the spiked members bored axially so as to slide on the rods.

The spiked portion of the spiked member is preferably formed with a gradual taper from the point to the main body portion of the spiked member.

Usually, a series of pairs of spiked members will be provided and a convenient arrangement is to mount the pairs on separate arms extending from a central supporting member that is rotatably mounted so as to carry a succession of articles through various stages of manufacture or manipulation. Alternatively, the spiked members may be mounted at spaced intervals on a conveyor chain.

Figure 1:
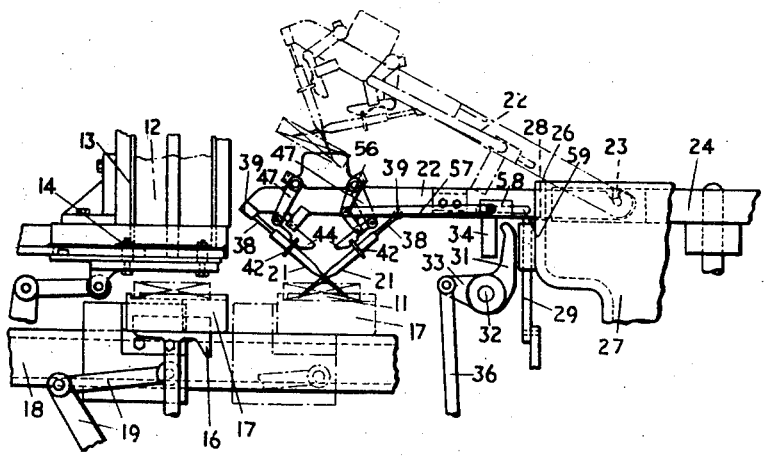
Figure 2:
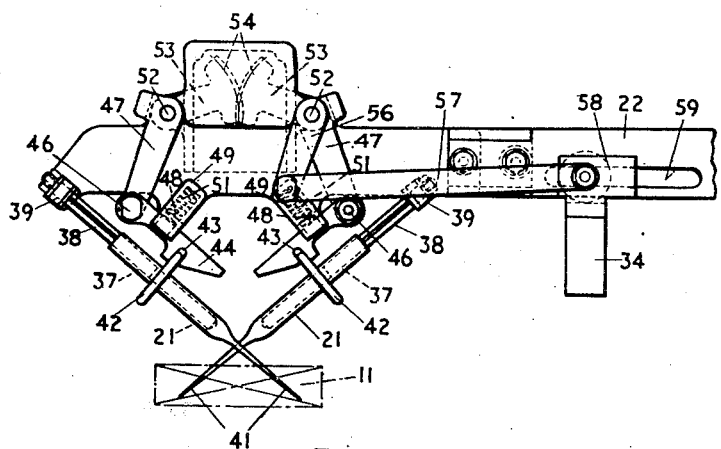
Figure 3:
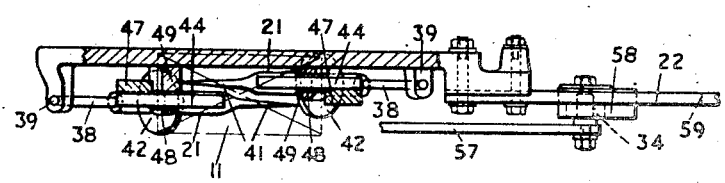

One form of apparatus according to the invention will now be described in greater detail with reference to the accompanying drawings, in which Figure 1 is an elevation of a portion of a machine for cutting, dipping and wrapping blocks of frozen ice-cream, Figure 2 is an elevation of part of the apparatus shown in Figure 1, drawn to a larger scale, and Figure 3 is a plan view of the apparatus shown in Figure 2 with upper portions of the structure removed.

Referring to Figure 1, blocks 11 of frozen ice-cream are cut in succession from a strip 12, supported in a magazine 13, by a cutting device generally indicated by reference numeral 14. During the cutting operation, the strip 12 is supported on a platform 16 arranged to move from its inoperative position shown in Figure 1 upwardly to a position spaced from the base of the magazine by an amount equal to the thickness of the block 11. After the block is cut, the platform 16 is lowered below the level of the supporting surface of a transfer member 17 so as to leave the block supported on the transfer member, the supporting surface of the transfer member being formed with an aperture for the passage of the platform 16. The strip 12 is supported in the meantime by the knives of the cutting device 14 which rest at the completion of each cutting operation until the platform 16 is once more moved up into position to receive another block. The transfer member 17 is slidably mounted on a support 18 and arranged for reciprocation by a cam-operated link and arm mechanism 19, the transfer member being arranged to move from a position below the magazine 13 to the position shown in chain dotted lines.

As the transfer member 17 reaches the limit of its forward movement, the block 11 supported thereon is seized by a pair of spiked members 21 which are caused to penetrate the upper surface of the block so as to support it during subsequent manipulation. The spiked members 21 are carried in pairs on radial arms 22 (one only shown) pivotally mounted at 23 on an intermittently rotatable support 24 and arranged to slide on a cam surface 26 formed on a stationary cam member 27, the cam surface causing the arms to rise and fall to carry the block from one level to another (as indicated in chain dotted lines in Figure 1) during the course of its passage through the apparatus.

In the position shown in Figure 1, the arm 22 has moved from the cam surface 26 into a slot 28 formed in the periphery of the cam member 27 so as to lower the spiked members 21 to the seizing position, the arm 22 resting during such movement on a slidable support 29 arranged for reciprocation in a vertical direction. The seizing action of the spiked members 21 is controlled by a striker 31 pivotally mounted at 32 and formed with an arm 33 by which it is rocked to strike an abutment 34, slidably mounted in the arm 22, by a cam operated link 36. As soon as the block 11 is seized by the spiked members 21, the support 29 rises to lift the arm clear of the slot 28 and the support 24 is moved through a further portion of a revolution during which the arm 22 again slides on the cam surface 26 which guides the arm during the subsequent dipping operation. The dipping and wrapping operations form no part of this invention and need not, therefore, be described.

The construction of the spiked members and their operating mechanism is shown in greater detail in Figures 2 and 3 to which reference will now be made.

The spiked members 21 are bored axially at 37 and are slidably mounted on a pair of cylindrical supports 38 secured to lugs 39 formed on the arm 22, the supports being inclined in opposite directions at an included angle of approximately 100°. The spiked portions 41 of the spiked members are formed with a gradual taper from the point to the main body portion in which the bore 37 is formed. The body portion of each spiked member is formed with a collar 42 for engagement with a slot 43 in an actuating member 44 pivotally connected at 46 to an arm 47 and passing through a guiding slot 48 in an extension 49 from the arm 22, the extension being bored for the reception of a spring 51 for retaining the actuating member 44 in engagement with the collar 42. The arms 47 are secured to shafts 52 pivotally mounted on the arm 22 and are formed with extensions 53 on which are formed arcuate racks 54 arranged in engagement with each other. The right hand arm 47 of one operating mechanism (as appears in Figures 1 and 2) is rocked by an arm 56 secured to the shaft 52 and pivotally attached to one end of a link 57; the other end of said link 57 is pivotally attached to a block 58 slidably mounted in a slot 59 in the arm 22, the said block 58 carrying the abutment 34.

It will thus be seen that as the abutment 34 is struck by the striker 31 after the arm 22 has been lowered into the slot 28, the block 58 slides in the slot 59 to push the link 57 to rock the arm 56 which, in turn, pivots the adjacent arm 47 and causes the actuating member 44 to move the spiked member 21 along its support 38 so as to penetrate the block 11, the other arm 47 being caused to pivot at the same time, by the action of the racks 54, to operate the other spiked member 21 of the pair. Withdrawal of the spiked members 21 from the block 11 is brought about by a further striker (not shown) similar to the striker 31, arranged to operate at a later stage in the cycle. The spiked members may be rotated on their supports, if desired, to facilitate smooth withdrawal.

We claim:

1. Apparatus for manipulating articles of plastic material, comprising at least one removable arm for transporting the articles from one station to another, a pair of supporting rods depending from said arm and inclined to each other, a pair of spiked members bored axially for sliding movement on said rods, and actuating means for moving the spiked members on said rods to cause them to penetrate one side of the article so as to seize the article and support it during subsequent manipulation.

2. Apparatus for manipulating articles of plastic material, comprising at least one movable arm for transporting the articles from one station to another, a pair of supporting rods depending from said arm and inclined to each other, a pair of spiked members each formed with a single tine and bored axially for sliding movement on said rods, and actuating means for moving the spiked members on said rods to cause them to penetrate one side of the article so as to seize the article and support it during subsequent manipulation.

3. Apparatus for manipulating articles of plastic material, comprising at least one movable arm for transporting the articles from one station to another, a pair of supporting rods depending from said arm and inclined to each other, a pair of spiked members each formed with a single tine and bored axially for sliding movement on said rods, a collar formed on each of said spiked members, and actuating means arranged to engage said collars for moving the spiked members on said rods so as to cause them to penetrate one side of the article so as to seize the article and support it during subsequent manipulation.

4. Apparatus for manipulating articles of plastic material, comprising at least one movable arm for transporting the articles from one station to another, a pair of supporting rods depending from said arm and inclined to each other, a pair of spiked members each formed with a single tine and bored axially for sliding movement on said rods, a collar formed on each of said spiked members, actuating means arranged to engage said collars for moving the spiked members on said rods so as to cause them to penetrate one side of the article so as to seize the article and support it during subsequent manipulation, said actuating means comprising a pair of arms pivotally mounted on said movable arm, an actuating member pivotally attached to each of said pivoted arms, said actuating members being slotted to engage said collars, spring means for urging said actuating members into engagement with the collars, and means for oscillating said pivoted arms to cause said spiked members to move into and out of article-seizing position.

5. Apparatus for manipulating articles of plastic material, comprising at least one movable arm for transporting the articles from one station to another, a pair of supporting rods depending from said arm and inclined to each other, a pair of spiked members bored axially for sliding movement on said rods, a collar formed on each of said spiked members, and actuating means arranged to engage said collars for moving the spiked members on said rods to cause them to penetrate one side of the article so as to seize the article and support it during subsequent manipulation.

6. Apparatus for manipulating articles of plastic material, comprising at least one movable arm for transporting the articles from one station to another, a pair of supporting rods depending from said arm and inclined to each other, a pair of spiked members bored axially for sliding movement on said rods, a collar formed on each of said spiked members, actuating means arranged to engage said collars for moving the spiked members on said rods to cause them to penetrate one side of the article so as to seize the article and support it during subsequent manipulation, said actuating means comprising a pair of arms pivotally mounted on said movable arm, an actuating member pivotally attached to each of said pivoted arms, said actuating members being slotted to engage said collars, spring means for urging said actuating members into engagement with the collars, and means for oscillating said pivoted arms to cause said spiked members to move into and out of article-seizing position.

ALFRED GERMAN ROSE.
JOSEPH ARTHUR GILBERT.

REFERENCES CITED

The following references are of record in the file of this patent:

UNITED STATES PATENTS

| Number | Name | Date |
|---|---|---|
| 2,334,654 | Sportolari | Nov. 16, 1943 |

FOREIGN PATENTS

| Number | Country | Date |
|---|---|---|
| 453,216 | Germany | Dec. 6, 1927 |